United States Patent

Palmer

Patent Number: 5,307,586
Date of Patent: May 3, 1994

[54] FISHHOOK REMOVER

[76] Inventor: Vincent Palmer, 12701 Cambridge La., Leawood, Kans. 66209

[21] Appl. No.: 28,427

[22] Filed: Mar. 9, 1993

[51] Int. Cl.$^5$ .................................................. A01K 97/00
[52] U.S. Cl. ........................................... 43/53.5; 43/4
[58] Field of Search ................... 43/53.5, 4; 128/20; 294/100, 26

[56] References Cited

U.S. PATENT DOCUMENTS

| | | | |
|---|---|---|---|
| 2,507,083 | 5/1950 | Anderson | 43/53.5 |
| 2,578,289 | 12/1951 | Danielson | 43/53.5 |
| 2,688,816 | 9/1954 | Bondesen | 43/53.5 |
| 2,795,887 | 6/1957 | Lockert | 43/53.5 |
| 2,797,523 | 7/1957 | Dillard | 43/53.5 |
| 2,892,284 | 6/1959 | Shawhan | 43/53.5 |
| 3,451,157 | 6/1969 | Jones | 43/53.5 |
| 3,721,034 | 3/1973 | Collins | 43/53.5 |
| 4,389,770 | 6/1983 | Bocinski et al. | 294/100 |
| 4,590,702 | 5/1986 | Chestnutt | 43/53.5 |

*Primary Examiner*—Paula A. Bradley
*Assistant Examiner*—Chuck Y. Mah
*Attorney, Agent, or Firm*—Kenneth W. Iles

[57] ABSTRACT

A fishhook remover includes a tubular housing for retaining a cylindrical plunger biased toward the bottom of the fishhook remover by a compression spring bearing against the plunger in a handle end, capped by a knob. A T-shaped handled mounted on the plunger allows the fisherman to reciprocate the plunger within the tubular housing. A grabber hook extending from the working end of the plunger is used to grab the embedded fishhook by the shank. Pulling the handle toward the knob at the top of the device causes the fishhook to become aligned with fishhook aligning means consisting of a downwardly extending flange portion of the tubular housing and into a V-shaped notch in the flange portion. Further, a pair of opposed slots in the lower portion of the tubular housing allow the curved shank portion of the hook to slide through the slots as the fishhook is drawn into the lower portion of the housing and thereby the fishhook is withdrawn from the fish along the same path it took when it entered the fish.

11 Claims, 1 Drawing Sheet

FISHHOOK REMOVER

BACKGROUND OF THE INVENTION

1. Field of the Invention

The present invention is related to an apparatus for removing a fishhook from a fish without causing significant additional injury to the fish so that the survival rate of hooked fish is greatly increased. More particularly, the present invention is directed to an apparatus or device that allows even a swallowed hook to be extracted from the fish without further injury to the fish by invariably rotating the fishhook so that it is removed from the fish along the same path that it hooked the fish.

2. Description of Related Art Including Information Disclosed Under 37 C.F.R. Sections 1.97-1.99.

Fish often swallow fishhooks deep into their throats or other parts of their bodies that are difficult for a fisherman to reach. When this happens, removing the hook without immediately killing the fish in the process is extremely difficult, if not impossible. If the fish is so killed, it is useless for any conventional purpose. Obviously, the fish cannot be returned to the waters to live and be caught another day. Nor can the fish be eaten in the normal course of the fishing experience because dead fish decompose very quickly. If such a fish were to be eaten, the fisherman would immediately have to stop fishing, clean and eat the fish on the spot. This is not usually possible or desireable. Therefore, many fish are inadvertently killed when the fisherman does not want to kill the fish.

This problem has led to efforts at solutions, some of which have led to issued United States Patents, some of which are discussed below.

U.S. Pat. No. 2,507,083, issued to Anderson on May 9, 1950 (Anderson '083), discloses a "Fishhook Extractor" comprising a tubular device having a central shaft that reciprocates within a housing and carries a notch at the end of the shaft for engaging a fishhook. A lip formed on the forward end of the tubular housing clamps the hook between the housing and the notch in the rod. This device does not rotate the hook, but merely grips it, much as pliers would. This device may retrieve a fishhook, but at the expense of seriously increased trauma to the fish by ripping through the tissues engaged by the hook.

U.S. Pat. No. 2,578,289, issued to Danielson on Dec. 11, 1951 (Danielson '289), discloses a "Fishhook Remover" comprising a tubular housing holding a reciprocating shaft having an exposed compression spring for holding the handle or knob in an extended position away from the housing. The shaft includes a T-shaped handle at the top. The lower end of the housing tubing includes a notch that aligns with a similarly shaped trapezoidal notch in the shaft. The fishhook is gripped between the housing and the shaft when the shaft is depressed. The fishhook is not rotated into position, but is simply gripped, as by pliers. Like Anderson, '083, Danielson '289 seriously increases trauma to the fish.

U.S. Pat. No. 2,795,887, issued to Lockert on Jun. 18, 1957 (Lockert '887), discloses a "Fish Hook Extractor" comprising an exterior cylindrical housing having a knob handle on one end and containing a slide member connected to a T-shaped handle for reciprocal movement within the housing. A compression spring biases the slide member downward. The slide member has a hook in the end opposite the knob. The working end of the tubular housing includes inclined or beveled edges providing a rounding bearing surface. The slide member is flat and moves from one side of the housing to the other as the hook is extracted. The eye end of the fishhook is pried against the soft tissues of the fish in order to disengage the hook, which further injures the fish.

U.S. Pat. No. 2,797,523, issued to Dillard on Jul. 2, 1957 (Dillard '523), discloses a "Fishhook Extractor" comprising a tubular housing having a T-shaped handle and an inner tube held in place by a compression spring and having a knob at its end for reciprocal movement within the housing tube. A stripper element is also moveable within the housing and draws the fishhook into the housing. The stripping operation thereby removes the hook from the fish, drawing the hook toward the housing.

U.S. Pat. No. 3,451,157, issued to Jones on Jun. 24, 1969 (Jones '157), discloses a "Fishhook Remover" comprising a main tubular member or housing having a crosswise handle secured at one of its ends and a slidable rod inside the housing operated by a sleeve or finger handle which causes a fishhook engaging hook at the bottom of the rod to engage the lower end of the housing. The fishhook is grasped between the hook at the end of the rod and an undercut projection at the end of the housing. The purpose of this device is to remove the fishhook from the fish with no regard to further injury to the fish. A preferred embodiment of the invention includes a weighted filler of lead or the like "for use as a hammer for killing a landed fish." Accordingly it is clear that Jones '157 is primarily concerned with retrieving the fishhook and is not in any sense concerned with reducing injury or death to the fish.

U.S. Pat. No. 4,590,702, issued to Chestnutt on May 27, 1986, (Chestnutt '702), discloses a "Fishhook Removing Tool" comprising an elongated tubular housing holding a telescoped pull member having a plunger handle at the end and held in the closed position by a compression spring seated inside the housing. A T-shaped handle on the housing allows the fisherman to actuate the plunger. A hook engaging member similar to the eye of a needle, but with a small opening along the eye, on the end of the rod engages the hook and pulls it against the end of the housing, thereby clamping the hook between the housing and the removal hook of the tool. Then, the tool may be pushed downwardly relative to the fish to displace the hook from the fish. Chestnut '702 also simply rips the hook from the fish, thereby increasing the injury and trauma to the fish.

Each of the above references discloses a fishhook remover or extractor and each comprises a cylindrical body having a reciprocating rod within the body or housing. The use of a spring to bias the rod toward a closed position or upright position is disclosed in Danielson '289, Lockert '887, Dillard '523, Jones '157 and Chestnutt '702. The use of a guide at the end of the tubular housing for assisting in gripping a hook is disclosed in Anderson '083, Danielson '289, Lockert '887 and Dillard '523. Lockert '887 includes a cam surface on the edge of the housing. Most of these references merely grip the hook, as pliers would and do not claim to reduce injury or death to the fish. They simply allow the fisherman to retrieve his hook.

Therefore, a need exists for a fishhook remover that allows the fisherman to remove a hook from a fish easily without tearing tissues of the fish, even when the fish has "swallowed the hook" or hooked its gills.

SUMMARY OF THE INVENTION

Accordingly, it is a primary object of the present invention to provide a fishhook remover that allows a fisherman to remove a hook from a fish without further injuring the fish.

It is another primary object of the present invention to allow a fisherman to remove a fishhook from a fish by directing the hook back along the same path it entered the tissues of the fish, thereby minimizing any further injury to the fish and increasing the chances that the fish will survive.

It is another object of the present invention to provide a fishhook remover that allows a fisherman to remove a hook from a fish easily even when the hook is embedded deep within the fish.

It is another object of readily retrieve a hook embedded in the gills of the fish without further injuring the fish.

The present invention overcomes the problem discussed above by providing a device for extracting fishhooks from otherwise awkward locations within the fish. The device pulls the hook out of the fish along the same path that it penetrated the tissues of the fish, but in the opposite direction and therefore with a minimum of tearing and injury to the fish. Then the fisherman can keep the fish alive for later consumption or return it to the waters.

The fishhook remover disclosed herein provides a slender tool allowing ready accesses to a fish's throat and the like that includes a hook engaging member for grasping the fishhook and orienting members for aligning the shank of the fishhook to insure rotation of the hook into a hook removing position, from which the fishhook is withdrawn along the same path that it entered the tissues of the fish.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

DETAILED DESCRIPTION OF THE PREFERRED EMBODIMENTS

As required by the Patent Statutes and the case law, the preferred embodiment of the present invention and the best mode currently known to the inventor for carrying out the invention are disclosed in detail herein. The embodiments disclosed herein, however, are merely illustrative of the invention, which may be embodied in various forms. Therefore, specific structural and functional details disclosed herein are not to be interpreted as limiting, but merely to provide the proper basis for the claims and as a representative basis for teaching one skilled in the art to which the invention pertains to make and use the apparatus disclosed herein as embodied in any appropriately specific and detailed structure.

Figure 1:
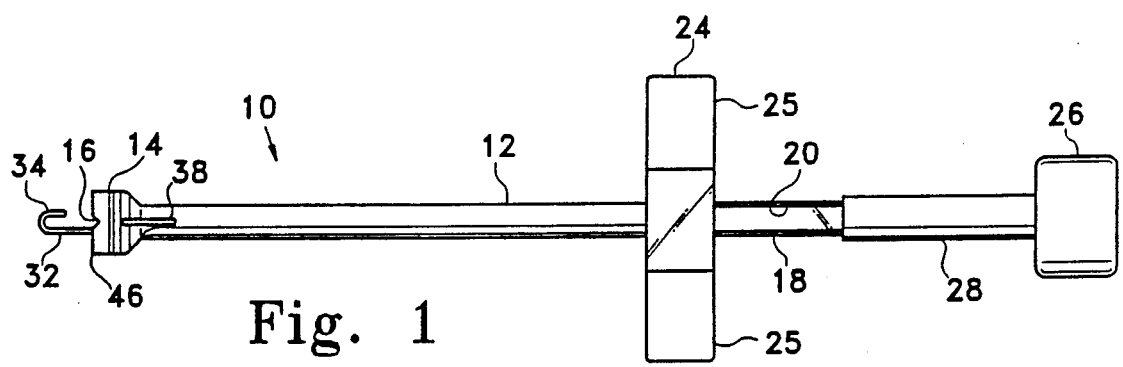
FIG. 1 is a top plan view of the present invention with the actuating slot facing up.
Figure 2:
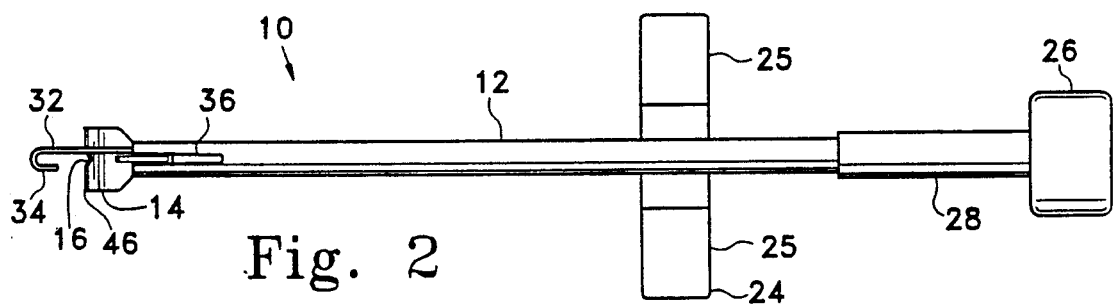
FIG. 2 is a bottom plan view of the fishhook remover of FIG. 1.
Figure 3:
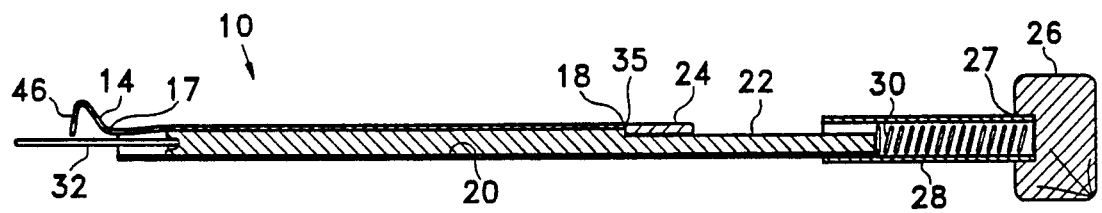
FIG. 3 is a cross sectional side elevation of the fishhook remover of FIG. 1.

Referring to FIGS. 1-3 there is shown a fishhook remover 10 according to the present invention, comprising a tubular housing 12 having an integrally formed fishhook engaging V-shaped flange 14 at one end defined by the bend 17 at a proximal end of the V-shaped flange 14 and by the distal end of the tubular housing 12 at the other end. The V-shaped flange 14 is a extension of the housing 12 and is located generally at a distal end of the tubular housing 12. If the housing 12 is made of relatively malleable material, e.g., brass, copper, and the like, it may be desirable to provide a fillet at the bend 17 to reenforce the bend 17 area and prevent bending of the fishhook remover 10 during use. It has been found, however, that when the housing 12, including the V-shaped flange 14, are made from stainless steel, no reenforcing fillet is required. Further, no plating with nickel or the like is required. The fishhook engaging V-shaped flange 14 is bent into a roughly V-shape and includes a V-shaped notch 16 along the bottom edge of the outermost portion.

A plunger shaft o plunger 20 is seated within the tubular housing 12. The plunger 20 has a diameter that is very nearly the same as the inside diameter of the tubular housing 12. A flat rectangular T-shaped actuating handle 24 is attached to the plunger shaft 20 in the position shown in the drawings. A portion of the plunger shaft 20 is flattened on one side by grinding or the like to form a flattened portion 22 of the plunger 20 to so that the outer surface of the T-shaped handle 24 is in the same plane as the outer edge of the tubular housing 12. This means that the T-shaped handle 24 strikes the edge of the cut out portion of the tubular housing at one end of its travel and the edge of a spring housing tube 28 at the other end of its travel, thereby providing built in stops that limit the travel of the T-shared handle 24 in either direction. The T-shaped handle 24 includes fiction grips 25, which may be tool dip, friction tap, knurling, and the like. The plunger 20 and T-shaped handel assembly 24 are preferably tumbled to remove burrs and then plated with nickel or the like prior to assembly.

A portion of the side wall of the tubular housing 12 is cut away to provide a cut away portion of the housing side wall 18, which serves as a guideway for allowing the plunger 20, which is seated within the tubular housing 12, to reciprocate within the tubular housing 12.

A knob 26 is glued to another, short section of tubular metal, or a spring housing tube 28, on a proximal end of the tubular housing 12, and the spring housing tube 28 has a diameter slightly larger than the tubular housing 12, so that the spring housing tube 28 slips over the tubular housing 12 snugly, and when properly positioned longitudinally, is soldered or otherwise fastened to the tubular housing 12, thereby providing an assembly that cannot come apart. A compression spring 30 is seated within the spring housing tube 28 adjacent to the knob 26 and bearing against the a proximal end of the plunger 20. In the equilibrium position, the spring compression spring 30 pushes the plunger 20 toward the flange 14 until the T-shaped actuating handle 24 engages the forward lip 35 of the cut out portion of the tubular housing 12, 16 as best shown in FIG. 3.

A fishhook grabber 32, comprising a bent stainless steel wire terminating in a U-shaped hook portion 34, is fixed to the other, or distal, end of the plunger shaft 20 and extends beyond the V-shaped flange 14 in the equilibrium position. The U-shaped hook portion 34 of the hook grabber 32 fits within the tubular housing 12, that is, the hook portion 34 has a width that is less than the inside diameter of the tubular housing 12. This allows the hook grabber 32 to be drawn into the lower end of the tubular housing 12 during removal of the fishhook from the fish, as described below.

An elongated tapered slot 36 is cut into the tubular housing 12 near the left-hand side, or distal end, of the fishhook remover 10 as shown in FIGS. 1-3, which is considered the bottom or working end of the fishhook remover 10 during use, which allows the hook grabber 32 and fishhook to be drawn into the lower portion of the tubular housing 12 when the fishhook is being removed from the fish. The elongated tapered slot 36 is wider at the distal end of the elongated tubular housing 12 and narrows to a mere slit as it disappears as it lies closer to the proximal end of the elongated tubular housing 12. The elongated tapered slot 36 is located on a bottom side of the fishhook remover 10. The bent fishhook locating and engaging flange 14, has a V-shaped notch 16 along its bottom edge for locating the fishhook once it has been engaged by the hook grabber 32. The fishhook engaging V-shaped flange 14, and its angles and construction, are crucial to the successful operation of the fishhook remover 10 and cause the fishhook to be rotated from whatever orientation it is in to one in which it is naturally drawn out of the fish along the same path it entered, thereby minimizing damage to the fish. The slot 36 prevents a fishhook from binding inside the tubular housing 12. Other elements of the fishhook remover 10, as discussed below, cooperate with the V-shaped notch 16 and the hook grabber 32 to assist in rotating the shank of the fishhook to draw the fishhook out of the fish along the same path by which it entered.

In the preferred embodiment, a parallel-edged slot 38 is cut into the top of the fishhook remover 10 (with top being the view shown in FIG. 1), and a second, longer slot aligned with the parallel-edged slot 38 is cut into the bottom (as shown in FIG. 2) of the fishhook remover 10. This longer slot is the elongated tapered slot 36, whose wide end is facing toward the left-hand side of FIG. 2 and is located on opposite from the parallel-edged slot 38 across a diameter of the tubular housing 12. The elongated tapered slot 36 and the parallel-edged slot 38 are parallel to one another and the parallel-edged slot 38 is opposite of the elongated tapered slot 36 and superposed with a portion of it. Further, the parallel edged slot 38 is located along a short length of the V-shaped flange 14 and the distal portion of the elongated tubular housing 12 in the area of the bend 17 that forms the V-shaped flange 14.

In a preferred embodiment, the tubular housing 12 and the spring housing tube 28 are made of copper tubing that is nickel plated inside and out. The knob 26 is made of wood and includes a bore 27 that is seated onto the right-hand end, as shown in FIGS. 1-3, of the spring housing tube 28 and is secured by a suitable adhesive or glue. The plunger shaft 20 and actuating handle 24 are made of steel or stainless steel and the T-shaped handle 24 is fixed to the plunger 20 by welding, soldering or the like. The compression spring 30 is made of spring stainless steel. The hook grabber 32 is made of stainless steel wire and is fastened to the plunger shaft by soldering, welding or the like. In a preferred embodiment, a short portion of the end of the plunger 20 is bored and the fastened end of the hook grabber 32 is bent into a small hook that fits within the bore. Stainless steel provides many well-known advantages, principally good toughness and resistance to corrosion. Naturally, other materials, for example plastic, could be employed for the housing, plunger, and handle. Further, the number of components could be changed while still providing a similar device.

Figure 4:
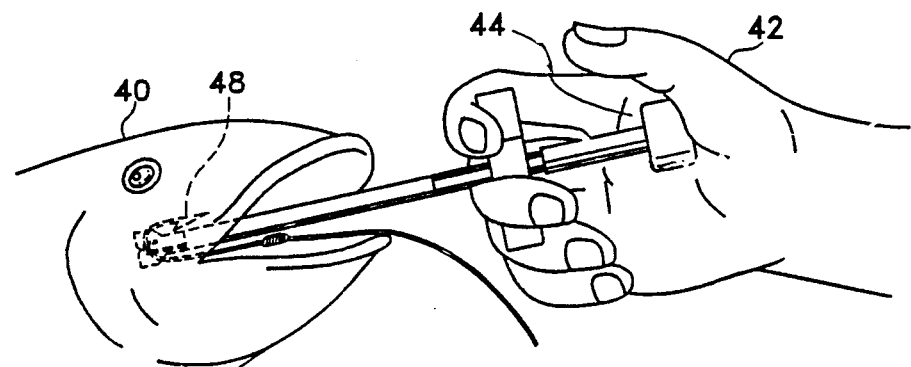
FIG. 4 is a perspective environmental view showing the fishhook remover of FIG. 1 in use in extracting a fishhook from the throat of a fish.

Referring to FIG. 4, in use, the fisherman rests the knob 26 against the palm 44 of his hand 42 and places an index finger on one side of the T-shaped actuating handle 24 and his middle finger on the other side, with the tubular housing 12 of the fishhook remover 10 between these two fingers. Then the user closes these two fingers, drawing the plunger 20 further into the tubular housing in an amount limited by the stop formed by the lip of the cut out portion of the tubular housing that is adjacent to the knob. This motion draws the hook grabber into the tubular housing. Releasing the T-shaped handle 20 allows the compression spring 30 to return the plunger 20 to the equilibrium position, that is, toward the left-hand end of the fishhook remover as shown in FIGS. 1-3.

Still referring to FIG. 4, to remove a hook from a fish, the fisherman inserts the flanged end 46 of the invention into the fish's mouth and engages the bent portion or shank of the fishhook with the hook grabber 32, and draws the T-shaped handle 20 toward the knob 26 enough to capture the shank of the fishhook 48 and bring it into contact with the edge of the V-shaped flange 14. Then the fisherman aligns the fishhook remover 10 so that the sharp end or barbed end of the fishhook 48 is oriented more or less in line with the V-shaped notch 16 in the hook engaging V-shaped flange 14. Then the plunger 20 is retracted as described above, thereby drawing the fishhook out of the fish along the same path that it engaged the tissues of the fish. The geometry of the fishhook and the hook grabber 32 combine to insure that the fishhook will be automatically turned to align it with the notch in the V-shaped fishhook engaging flange 14. Namely the shank of the typical fishhook is curved with a substantially U-shaped bend between the eye of the hook, to which the line is attached, and the barbed point of the fishhook. Similarly, the hook grabber 32 includes a U-shaped bend. When the fishhook is pulled, these two U-shaped bends undergo forces that tend to align the two members in perpendicular relationship to each other. The hook grabber 32 cannot rotate within the tubular housing 12 because the manner of mounting of the T-shaped handle 24 on the plunger 20 prevents it. Therefore, the fishhook must rotate and it rotates such that a longitudinal axis of the fishhook, that is the line defined when the fishhook is viewed from such a position that it appears to be substantially a straight line, is parallel to the slots 36 and 38. Then the curved portion of the shank of the fishhook is drawn partially into the tubular housing 12, and the wider spacing of the fishhook relative to the inside diameter of the tubular housing 12 is accommodated by portions of the fishhook sliding though either or both slots 36 and 38. At the same time, the fishhook is drawn back along itself, that is, it follows a path toward the eye end of the fishhook and curves back along the same path upon which it entered the fish. Thus, the fishhook remover 10 draws a fishhook out of a fish along the same path that it entered the fish, thereby minimizing any further damage to the fish and increasing its chances of surviving the encounter with the fisherman.

It has been found through extensive field studies that the fishhook remover 10 removes fishhooks with minimal trauma to the fish and allows many fish to be returned to the water who would otherwise be killed when a deeply seated fishhook is removed. It has further been found that the fishhook remover 10 allows the fisherman to remove fishhooks from the gills without killing the fish.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims.

I claim:

1. A fishhook remover comprising:
   a. an elongated tubular housing having a proximal end and a distal end and an elongated tapered slot along a bottom side of said elongated tubular housing with a wider portion end of said elongated tapered slot located at said distal end of said elongated tubular housing and a parallel-edged slot in said elongated tubular housing located on a top side of said elongated tubular housing and superposed along a portion of said elongated tubular housing;
   b. a fishhook engaging V-shaped flange at said distal end; and
   c. a plunger having a fishhook grabber at a distal end seated for reciprocal movement within said housing.

2. A fishhook remover according to claim 1 wherein said housing and said plunger are made of stainless steel.

3. A fishhook remover comprising:
   a. an elongated tubular housing having a proximal end, a distal end and a cut away portion along said elongated tubular housing wherein said elongated tubular housing further comprises an elongated tapered slot along a bottom side of said elongated tubular housing with a wider portion end of said elongated tapered slot located at said distal end of said elongated tubular housing and a parallel-edged slot in said elongated tubular housing located on a top side of said elongated tubular housing and superposed along a portion of said elongated tubular housing and
   b. a fishhook engaging V-shaped flange at said distal end of said elongated tubular housing and a V-shaped notch in said V-shaped flange;
   c. a plunger having a fishhook grabber fixed at a distal end of said plunger, said fishhook grabber further comprising a stainless steel wire having U-shaped hook portion and said plunger is seated for reciprocal movement within said housing; and
   d. an actuating handle fixed to said plunger at a location intermediate said proximal and said distal ends of said elongated tubular housing at a location within said cut away portion, whereby said handle reciprocates within said housing when said handle is reciprocated within said cut away portion of said housing.

4. A fishhook remover according to claim 3 further comprising means for biasing said plunger toward said distal end of said elongated tubular housing.

5. A fishhook remover according to claim 4 wherein said biasing means further comprises a compression spring seated in said tubular housing adjacent to said knob and bearing against a proximal end of said plunger.

6. A fishhook remover comprising:
   a. an elongated tubular housing having a proximal end, a distal end and a cut away portion along said elongated tubular housing and a spring housing tube fixed to said proximal end of said elongated tubular housing wherein said elongated tubular housing further comprises an elongated tapered slot along a bottom side of said elongated tubular housing with a wider portion end of said elongated tapered slot located at said distal end of said elongated tubular housing and a parallel-edged slot in said elongated tubular housing located on a top side of said elongated tubular housing and superposed along a portion of said elongated tubular housing;
   b. a fishhook engaging V-shaped flange at said distal end of said elongated tubular housing and a V-shaped notch in said V-shaped flange;
   c. a plunger having a fishhook grabber fixed at a distal end of said plunger, said fishhook grabber further comprising a stainless steel wire having U-shaped hook portion and said plunger is seated for reciprocal movement within said housing, an actuating handle fixed to said plunger at a location intermediate said proximal and said distal ends of said elongated tubular housing at a location within said cut away portion, whereby said handle reciprocates within said housing when said handle is reciprocated within said cut away portion of said housing and said reciprocal movement of said plunger is limited to a length of said cut away portion, whereby said plunger is prevented from disengaging from said elongated tubular housing; and
   d. means for biasing said plunger toward said distal end of said elongated tubular housing wherein said elongated tubular housing further comprises an elongated tapered slot along a bottom side of said elongated tubular housing with a wider portion end of said elongated tapered slot located at said distal end of said elongated tubular housing and a parallel-edged slot in said elongated tubular housing located on a top side of said elongated tubular housing and superposed along a portion of said elongated tubular housing.

7. A fishhook remover according to claim 6 further comprising a knob fixed to said spring housing tube.

8. A fishhook remover according to claim 6 wherein said biasing means further comprises a compression spring seated in said spring housing tube and bearing against said proximal end of said plunger, and against said knob.

9. A fishhook remover according to claim 6 wherein said elongated tubular housing and said plunger are made of stainless steel.

10. A fishhook remover according to claim 6 wherein said actuating handle further comprises a T-shaped handle having friction grips thereon.

11. A fishhook remover according to claim 6 further comprising a flattened section along an exterior surface of said plunger wherein said plunger is otherwise substantially cylindrical and said actuating handle is fixed to said flattened section of said plunger and said flattened section of said plunger lies along said cut away portion of said housing.

* * * * *